United States Patent [19]

Woo et al.

[11] Patent Number: 4,794,155

[45] Date of Patent: Dec. 27, 1988

[54] PROCESS FOR FORMING ARYLETHER POLYMERS

[75] Inventors: Edmond P. Woo; Hendrik E. Tuinstra; Michael J. Mullins, all of Midland, Mich.

[73] Assignee: The Dow Chemical Company, Midland, Mich.

[21] Appl. No.: 89,467

[22] Filed: Aug. 26, 1987

[51] Int. Cl.[4] .................... C08G 8/02; C08G 14/00
[52] U.S. Cl. .................................... 528/125; 528/9; 528/10; 528/28; 528/29; 528/43; 528/171; 528/210; 528/211; 528/14
[58] Field of Search .................. 528/10, 171, 43, 30, 528/14, 25, 29, 9, 28, 210, 125, 211

[56] References Cited

U.S. PATENT DOCUMENTS

| 3,264,536 | 8/1966 | Robinson et al. | |
|---|---|---|---|
| 3,514,415 | 5/1970 | Karol | 528/210 |
| 3,886,121 | 5/1975 | Yagi et al. | 528/125 |
| 4,065,437 | 12/1977 | Blinne et al. | |
| 4,232,142 | 11/1980 | Barr et al. | 528/125 |
| 4,239,884 | 12/1980 | Dahl | 528/125 |
| 4,252,937 | 2/1981 | Marvel et al. | |
| 4,474,932 | 10/1984 | Bier | |
| 4,503,168 | 3/1985 | Harsting | |
| 4,550,140 | 10/1985 | Rimsa et al. | 528/125 |
| 4,654,410 | 3/1987 | Kashiwame et al. | 528/171 |
| 4,711,945 | 12/1987 | Daniels | 528/125 |
| 4,716,211 | 12/1987 | Clendinning | 528/125 |

OTHER PUBLICATIONS

Attwood et al., "Synthesis and Properties of Polyarylether Ketones", 20, *Polymer Prep. Am. Chem. Soc.*, 191, (1979).
Attwood et al., "Synthesis and Properties of Polyarylether Ketones", 22, Polymer, 1096, (1981).

*Primary Examiner*—John C. Bleutge
*Assistant Examiner*—Ralph H. Dean, Jr.

[57] ABSTRACT

A moiety with the formula:

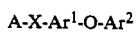

$$A-X-Ar^1-O-Ar^2$$

reacts in the presence of a catalyst with a moiety of the formula:

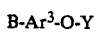

$$B-Ar^3-O-Y$$

to form a linkage of the formula:

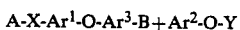

$$A-X-Ar^1-O-Ar^3-B+Ar^2-O-Y$$

wherein $Ar^1$, $Ar^2$ and $Ar^3$ are aromatic moieties, X is an activating group, Y is a hydrogen, a trihydrocarbylsilyl, a trihydrocarbyltin, or a carbonyl moiety, and the catalyst is a catalyst capable of abstracting the group Y from the second moiety. The reaction can be used to create a polyarylether polymer.

24 Claims, No Drawings

PROCESS FOR FORMING ARYLETHER POLYMERS

BACKGROUND OF THE INVENTION

The instant invention relates to the art of polymer chemistry and most particularly to the art of making polyarylether polymers.

Polyarylethers, such as polyether ether ketone and polyaromatic ether sulfones, are a well-known class of thermoplastic polymers with good strength and solvent resistance and high continuous use temperatures. Such polymers and their uses have been reported in several patents, such as Robinson et al., Capacitor with a Polyarylene Polyether Dielectric, U.S. Pat. No. 3,264,536 (Aug. 2, 1966); Blinne et al., Aromatic Polyether Sulfones, U.S. Pat. No. 4,065,437 (Dec. 2, 1977); Marvel et al., Polyaromatic Ether-Keto-Sulfones and Their Synthesis, U.S. Pat. No. 4,252,937 (Feb. 2, 1981) and Harsting, Cookware Made From Polyarylethersulfone, U.S. Pat. No. 4,503,168 (Mar. 5, 1985).

Polyarylethers have been prepared by Friedel-Crafts reaction of an acyl halide with an aromatic ether. See Marvel et al., supra; Attwood et al., "Synthesis and Properties of Polyaryl Ether Ketones", 20 POLYMER PREP.AM. CHEM. SOC. 191 (1979). Such methods are inefficient because the polymer traps substantial amounts of catalyst, such as aluminum chloride, which must be removed to prevent cross-linking of the polymer. Furthermore, as solvent many such reactions rely upon anhydrous hydrofluoric acid, which is particularly treacherous to work with.

Polyarylethers have also been prepared by displacement of halide from an aromatic dihalide by a metal salt of an aromatic diol. Attwood et al., "Synthesis and Properties of Polyarylether Ketones", 22 POLYMER 1096 (1981). That process contaminates the polymer with large amounts of difficult-to-remove metal halide salts and relies upon expensive diphenyl sulfone as a solvent. A similar process has been reported using the reaction of an aromatic dihalide with an aryl bis(trimethylsiloxy) compound. Bier, Process for the Production of Aromatic Ethers and Aromatic Polyethers, U.S. Pat. No. 4,474,932 (Oct. 2, 1984).

What is needed is a process to make polyarylethers which produces only volatile coproducts and which requires no dangerous or expensive solvents.

SUMMARY OF THE INVENTION

The instant invention comprises a process for preparing an aromatic ether polymer or oligomer, wherein a first monomer which contains one or more activated aryl-aryl ether moieties, comprising an aryl moiety bonded directly in ortho or para positions to:
(1) an activating group, which comprises an electron withdrawing moiety with sufficient strength to activate the aryl-aryl ether group so that exchange of aryloxy moieties occurs under reaction conditions; and
(2) an aryloxy moiety
reacts with a second monomer which contains:
(1) one or more aryloxy moieties linked by the oxygen directly to;
(2) a leaving group that can easily be removed from the oxygen by a catalyst,
in the presence of a catalytic amount of a catalyst which is capable of abstracting the leaving group from the second monomer under conditions such that an aryloxy moiety in an aryl-aryl ether moiety of the first monomer is exchanged for an aryloxy moiety of the second monomer.

The instant process uses no extremely dangerous reagents or solvents and when driven to completion produces polyarylethers in high yields with few by-products which require little purification.

DETAILED DESCRIPTION OF THE INVENTION

Preferably, linkages between monomers in the process of this invention will be formed by the following reaction:

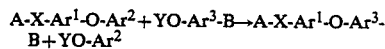
$A\text{-}X\text{-}Ar^1\text{-}O\text{-}Ar^2 + YO\text{-}Ar^3\text{-}B \rightarrow A\text{-}X\text{-}Ar^1\text{-}O\text{-}Ar^3\text{-}B + YO\text{-}Ar^2$ wherein $Ar^1$, $Ar^2$ and $Ar^3$ are aryl moieties, X is an activating group as described hereinbefore, Y is a leaving group as described hereinbefore and A and B represent the remainder of the respective monomers, which may be attached to other recurring units. A and B may comprise, for example, an aryl-aryl ether moiety, a phenolic moiety, or a polyarylether moiety.

A monomer may contain both moieties necessary to form the linkage, in which case it will ordinarily follow the formula:

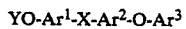
$YO\text{-}Ar^1\text{-}X\text{-}Ar^2\text{-}O\text{-}Ar^3$ and yield a polymer of the formula:

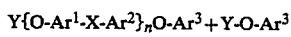
$Y\{O\text{-}Ar^1\text{-}X\text{-}Ar^2\}_n O\text{-}Ar^3 + Y\text{-}O\text{-}Ar^3$ wherein $Ar^1$, $Ar^2$ and $Ar^3$ are aryl moieties, X is an activating group as described hereinbefore, Y is a leaving group as described hereinbefore and n is a number of repeating units in excess of one.

Furthermore, one monomer may contain two or more linkage-forming moieties and may be copolymerized with other monomers containing two or more compatible linkage-forming moieties. Such comonomers will typically conform to the formulas:

$Ar^1\text{-}O\text{-}Ar^2\text{-}X\text{-}Ar^3\text{-}O\text{-}Ar^4$ and $YO\text{-}Ar^5\text{-}OY$ and yield a polymer which conforms to the formula:

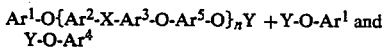
$Ar^1\text{-}O\{Ar^2\text{-}X\text{-}Ar^3\text{-}O\text{-}Ar^5\text{-}O\}_n Y + Y\text{-}O\text{-}Ar^1$ and $Y\text{-}O\text{-}Ar^4$ wherein X, Y and each Ar independently conform to the descriptions set out hereinbefore and n represents a number of repeating units in excess of one.

The aryl moieties may be any aryl group which is stable under reaction codditions. Preferably, the aryl moieties contain from 6 to 18 carbon atoms and are unsubstituted or substituted only with hydrocarbyl, alkoxy, aryloxy or halide moieties. Most preferably, the aryl moieties are unsubstituted. For example, an aryl moiety may be a phenyl group, a naphthyl group, a tolyl group or a biphenyl group.

The activating group, X, preferably comprises a sulfonyl, carbonyl, sulfoxide or azo group and is bonded directly to an aryl moiety ortho or para to an aryloxy moiety. More preferably, the activating group is para to the oxygen of the aryl ether. Most preferably, the activating group comprises either a carbonyl or sulfonyl group. It should also be understood that X may comprise two activating groups at opposite ends of an inert group, for instance -SO$_2$-R-SO$_2$- wherein R is an organic moiety inert with respect to all reagents under reaction conditions. Examples of X include a carbonyl group, a sulfonyl group, a sulfoxide group, an azo group, or an isophthaloyl group.

The leaving group, Y, is preferably R$_3$Si, R$_3$Sn, R$_3$C, RCO or H, wherein each R is independently a 1 to 10 carbon hydrocarbon radical optionally substituted with alkoxy, aryloxy or halide substituents. More preferably, the leaving group, Y, is hydrogen or R$_3$Si. Most preferably, the leaving group is hydrogen or a trimethyl silyl group.

Monomers useful in the present invention are known in the art and can be prepared by a number of different processes known to the art. Aromatic diols, such as hydroquinnne and bisphenol A, are well known in the art and are commercially available. Aromatic bis(trimethylsiloxy) monomers can be made by heating an aromatic diol with hexamethyldisilazane. Methods to make such compounds are taught in Bier, Process for the Production of Aromatic Ethers and Aromatic Polyethers, U.S. Pat. No. 4,474,932 (Oct. 2, 1984).

Activated bis-(diaryl ethers) of the formula:

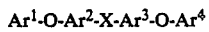

Ar$^1$-O-Ar$^2$-X-Ar$^3$-O-Ar$^4$ can be prepared by two different methods. First, a diaryl ether may be reacted with a di-acid chloride under Friedel-Crafts conditions. An example of such a process would be the Friedel-Crafts reaction of diphenyl oxide with phosgene, isophthaloyl chloride or sulfuryl chloride. Further examples of compounds useful in the present invention and processes for making them are found in Keller, Preparation of Dihydroxybenzophenones, U.S. Pat. No. 3,366,691 (Jan. 30, 1968) and Marvel et al., Polyaromatic Ether-Keto-Sulfones and Their Synthesis, U.S. Pat. No. 4,252,937 (Feb. 2, 1981).

Second, activated bis-aryl ethers can be prepared by reacting an activated bis-(aryl chloride of the formula, Cl-Ar$^2$-X-Ar$^3$-Cl, with a phenolic compound at a temperature and pressure sufficient for the phenolic compound to displace the chlorine. Bis(chloroaryl) ketones, sulfones and sulfoxides are known and commercially available. Bis-(chloroaryl) azo compounds can be prepared by processes described in Houghton, et al., The Nitration of p,p'-dichloroazobenzene, 1950 J. Chem Soc. 1018 (1950).

Monomers of the formula:

YO-Ar$^1$-X-Ar$^2$-O-Ar$^3$ can be prepare by a two step process. First, methoxybenzoyl chloride, methoxybenzenesulfonyl chloride, methoxybenzenesulfoxy chloride or a similar compound is reacted with a diaryl ether, for instance diphenyl oxide, under Friedel-Crafts acylation conditions. That reaction generates a compound of the formula:

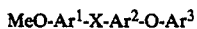

MeO-Ar$^1$-X-Ar$^2$-O-Ar$^3$

Second, the methoxy group is converted to a hydroxyl group by heating with pyridine chloride and washing with aqueous hydrochloric acid. If the Y group is to be a trimethylsiloxy group, the product may further be heated with hexamethyldisilazane as described hereinbefore.

The catalyst for the reaction may be any material capable of abstracting the leaving group off of a monomer under reaction conditions. Preferably, the catalyst is an alkali or alkaline earth metal halide, hydride, carbonate, alkoxide or aryloxide. More preferably, the catalyst is a fluoride, carbonate, phenate or alkoxide of cesium, potassium or sodium. Most preferably, the catalyst is cesium phenate.

The catalyst may be mixed with the monomers in any concentration effective to promote exchange of aryloxy moieties. When the catalyst is a halide, hydride or carbonate salt, its concentration is preferably about 1 to about 50 mole percent of the monomer. When the catalyst is an alkoxide or aryloxide salt, its concentration is preferably about 0.1 to 2 mole percent and most preferably abuut 0.2 to 2 mole percent of the monomer.

When two monomers are used, they may be used in any proportions from 10:1 to 1:10. The monomer bearing two leaving groups is used preferably in about a 5 to 20 percent excess and more preferably in about a 5 to 10 percent excess.

A solvent which is inert with respect to all reagents under reaction conditions, such as diphenyl sulfone, may be used, but is unnecessary. Preferably, no solvent is used. It is important that both water and oxygen be excluded from the system during the reaction. Water may be removed by adding a desiccant such as hexamethyldisilazane which reacts with water to form volatile products that are subsequently stripped off. Water can also be excluded by adding a monomer which reacts with water to form a diol useful in the reaction. An example of such a monomer is 4,4'-bis[trimethylsiloxy]-biphenyl. Oxygen may be excluded by flushing the system with a gas that is inert with respect to all reagents under process conditions, such as argon or nitrogen, preferably argon. The system is most preferably set up to permit a constant flow of argon through the system.

The reaction may be run at any temperature at which exchange of aryloxy moieties occurs in the activated aryl-aryl ether moiety. Because the reaction is an equilibrium reaction, it will typically be run at a temperature high enough to drive off any phenol or phenol derivative produced, thereby driving the polymerization to completion. The temperature of the reaction is preferably no less than about 200° C., more preferably no less than about 250° C., and most preferably no less than about 275° C. The reaction temperature should also be maintained low enough to avoid driving off essential monomer or catalyst and to avoid decomposing or thermally degrading the polymer. The temperature of the reaction is preferably no more than about 400° C., more preferably no more than about 375° C., and most preferably no more than about 350° C.

The polymer is ordinarily produced in high yields with few side products and requires little purification. It is frequently preferable to drive off any excess monomer either by vacuum distillation or by flowing inert gas over the hot molten polymer. Polymer products of this process are characterized by excellent toughness and solvent resistance, low flammability and water uptake, and the ability to withstand high continuous use temperatures without serious loss of strength. Molecular weights of polymers generated by the process will vary widely depending upon the starting materials and the extent to which polymerization is driven to completion. Ordinarily $M_n$ is between about 2000 and 10,000 and $M_w$ is between about 4000 and 30,000.

The following examples are for illustrative purposes only and are not intended to limit the scope of the specification or claims:

Illustrative Preparation of Monomers and Catalyst (a) 4-Methoxy-4'-phenoxybenzophenone Diphenyl oxide (52.2 g), 100 ml of dichloromethane, and 42.8 g of aluminum trichloride are added to a flask equipped with a mechanical stirrer, an addition funnel and a reflux condenser with a drying tube. 4-Methoxybenzoyl chloride (anisoyl chloride, 50 g) is added over 30 minutes. The mixture is stirred at ambient temperature for 2 days and then poured into 200 ml of 4M HCl. The organic layer is washed with 1M NaCl, dried with $MgSO_4$, and evaporated. After bulb-to-bulb distillation at 215° C. using 0.3 mm Hg pressure, product is recrystallized from dry ethanol to give 69.1 g (78 percent yield) of the title compound, with a melting point of 118° C.-119° C.

(b) 4-Hydroxy-4'-phenoxybenzophenone

4-Methoxy-4'-phenoxybenzophenone (33.4 g, from Example (a)) and 51 g of pyridine hydrochloride are heated in a molten salt bath at 220° C. for 3 hours and then poured into 200 ml of 1M HCl. The precipitate is filtered, washed with 1M HCl and water, and purified by bulb-to-bulb distillation at 225° C. and 0.1 mm Hg pressure followed by recrystallization from a 6:1 mixture of methanol and water. The reaction yields about 44.7 g (70 percent yield) of off-white crystals, which are the title compound.

(c) 4-Methoxyphenyl-4'-phenoxyphenylsulfone

Diphenyl oxide (68 g), 70 ml of dichloromethane, 82.8 g of 4-methoxybenzenesulfonyl chloride and 3.24 g of iron trichloride are added to a flask with a reflux condenser capped with a drying tube. After stirring for 18 hours at ambient temperature, 100 ml of dichloromethane is added and the solution is washed once with 100 ml of sodium hydroxide and twice with 100 ml of water. The solution is dried with sodium bisulfate and the solvent is evaporated. The remaining product is purified by bulb-to-bulb distillation at 250° C. and 0.3 mm of mercury pressure, followed by recrystallization from a 2:1 ethanol-methanol mixture, leaving 84.8 g (62 percent yield) of the title compound.

(d) 4-Hydroxyphenyl-4'-phenoxyphenylsulfone

4-Methoxyphenyl-4'-phenoxyphenylsulfone from Example (c), 13.6 g) and 19 g of pyridine hydrochloride are heated to 220° C. for 2½ hours and then poured into 200 ml of 1M HCl. The precipitate is filtered, washed with water and dissolved in 1M sodium hydroxide. The solution is washed with 100 ml of dichloromethane and then acidified with 6M hydrochloric acid to precipitate the product. The precipitate is recrystallized from toluene to give 10.9 g (84 percent yield) of the title compound.

(e) Bis-(4-phenoxyphenyl)sulfone

Phenol (98.82 g, 42 g of sodium hydroxide, 500 ml of toluene and 500 ml of dimethyl sulfoxide are placed in a flask equipped with a Dean-Stark trap, a reflux condenser, and a nitrogen inlet. The mixture is heated to remove water by azeotropic distillation with toluene. After the water is removed, 142.6 g of bis-(4-chlorophenyl)sulfone is added and toluene is distilled off as the internal temperature is raised to 140° C. The mixture is refluxed overnight, cooled and poured into one liter of water. The precipitate is filtered, washed with a 1:1 mixture of methanol and water, and dissolved in trichloromethane. After two treatments with activated charcoal, the solvent is evaporated and the product is recrystallized from isopropanol. The reaction yields 254 g (63 percent yield) of the title compound which melts at 142° C.-143° C.

(f) 1,3-Bis-(4-phenoxybenzoyl)benzene

Diphenyl oxide (51 g), 100 ml of dichloromethane and 13.3 g of aluminum trichloride are placed in a flask equipped with a mechanical stirrer, a reflux condenser and an addition funnel. After cooling the flask to −60° C., 10.15 g of isophthaloyl chloride is added over a 30-minute period. The reaction is stirred at 25° C. for 72 hours and refluxed for 4 hours. The reaction mixture is poured into 100 ml of 1M hydrochloric acid and the organic layer is washed once with ammonium hydroxide and twice with water. The organic layer is dried with sodium bisulfate and the solvent is evaporated. The product is recrystallized from methylethyl ketone, yielding 14.3 g (61 percent yield) of the title compound.

(g) 1,4-Bis-(trimethylsiloxy)benzene

Hydroquinone (60 g) and 127 ml of hexamethyldisilazane are refluxed in a flask equipped with a condenser capped with a drying tube, for 160 minutes until all the solid is dissolved and ammonia evolution has ceased. After an additional 90 minutes, the product is distilled directly from the flask at 82° C. and 0.3 mm of mercury pressure, giving 128.91 g (93 percent yield) of the title compound.

(h) 4,4-Bis-(trimethylsiloxy)biphenyl 4,4'-Biphenol (100 g) and 170 ml of hexamethyldisilazane are refluxed for 4 hours. The resultant amber solution is heated in a 150° C. oil bath at 0.5 mm mercury pressure to remove excess hexamethyldisilazane. The product is then purified by bulb-to-bulb distillation at 190° C. and 0.1 mm of mercury to yield 170.4 g (96 percent yield) of a white crystalline product.

(i) Cesium Phenate

Phenol (2.76 g) and 20 ml of methanol are placed in a flask under a nitrogen atmosphere. A freshly titrated sample of 5.94M cesium hydroxide is added slowly with magnetic stirring. After 5 minutes, the methanol is distilled off and the tan solid evacuated at 50° C. overnight, to yield 6.89 g of the title compound.

ILLUSTRATIVE EXAMPLES OF INVENTION

EXAMPLE 1—4-Hydroxy-4'-phenoxybenzophenone Polymer

A mixture of 8 g of 4-hydroxy-4'-phenoxybenzophenone and 95 mg of potassium carbonate is placed in a glass resin kettle and heated to 200° C. with stirring under aacuum for one hour to remove water. The reactor is vented with argon and heate for one hour at 250° C., 40 minutes at 290° C. and 16 hours at 315° C. Phenol is distilled out of the system during the polymerization. A polymer with an inherent viscosity of 0.42 dl/g, 0.500 g/dl in concentrated sulfuric acid is obtained.

EXAMPLE 2—1,3-Bis-[4-phenoxybenzoyl]benzene and bis-[4,4'-trimethylsiloxy]biphenyl copolymer A reactor is made from thick wall 50 mm ID glass tubing, with inlets at the top for mechanical stirring, a short path still and an inert gas inlet. The reactor is charged with 11.76 g of 1,3-bis-[4-phenoxybenzoyl]benzene, 9.08 g of bis-[4,4'-trimethylsiloxy]bpphenyl, and 90.8 mg of cesium phenate. The reactor is evacuated, vented with argon several times, and immersed in a 250° C. molten salt bath under a slightly positive argon pressure. The bath is heated to 300° C. for one hour, and an argon flow of 75 ml/sec is begun and the bath temperature is increased to 315° C. After 150 minutes, when most trimethylsiloxybenzene has distilled into the receiver, the argon flow is increased to 1.5 ml/sec, and after 30 minutes more the bath temperature is increased to 340° C. for 50 minutes, when the reaction is stopped. A polymer with an inherent viscosity of 1.05 dl/g (0.500 g/dl in concentrated sulfuric acid) is obtained.

EXAMPLE 3—4,4'-bis-[trimethylsiloxy]biphenyl and bis-[4-phenoxyphenyl]sulfone copolymer A reactor as described in Example 2 is charged with 12.076 g of bis-4-phenoxyphenyl]sulfone, 10.928 g of 4,4'-bis-[trimethylsiloxy]biphenyl and 49.4 mg of cesium phenate. The reactor is evacuated and vented with argon several times, then immersed in a 250° C. salt bath under slightly positive argon pressure with stirring. After leaving under those conditions overnight, the temperature is raised to 270° C. The temperature is further raised to 290° C. at 120 minutes, 315° C. at 263 minutes, 340° C. at 360 minutes and 350° C. at 450 minutes. After a total of 500 minutes, the stirrer is removed and the reactor allowed to cool. The named polymer, with an inherent viscosity of 0.36 dl/g (0.500 g/dl in dichloromethane), is obtained.

EXAMPLE 4—4,4'-Dihydroxybiphenyl, 4,4'-bis-[trimethylsiloxy]biphenyl, and bis-[4-phenoxyphenyl]sulfone copolymer 4,4'-Dihydroxybiphenyl (5.586 g), 0.992 g of 4,4'-bis-[trimethylsiloxy]biphenyl, 12.7 g of 4-phenoxyphenyl]sulfone and 92.3 mg of cesium phenate are placed in a glass resin flask fitted with a short path still, a capillary glass inlet and a mechanical stirrer. The system is vented several times with argon and heated to 280° C. for 9 hours. Next, the system is heated to 310° C. for 4 hours, after which a 1 ml/sec argon flow is started. After 6½ hours, the temperature is raised to 340° C. for 40 minutes and then the reaction is ended. The named polymer, with an inherent viscosity of 0.25 dl/g (0.500 g/dl in dichloromethane), is obtained.

EXAMPLE 5—Film of 4,4'-bis-trimethylsiloxy]biphenyl and bis-[4-phenoxyphenyl]sulfone copolymer Polymer from Example 3 is heated between the platens of a press to 280° C. under 20,000 psi pressure for two minutes. It is then removed from the press and allowed to cool. The result is a clear film of about 0.010 inches thickness which may be folded back upon itself three times without breaking.

We claim:

1. The process for preparing an aromatic ether polymer or oligomer comprising contacting (1) a first monomer which contains one or more activated aryl-aryl ether moieties having
   (a) an aryl moiety bonded directly to
   (b) an activating group which has an electron withdrawing moiety with sufficient strength to activate the aryl-aryl ether group so that exchange of aryloxy moieties occurs under reaction conditions and
   (c) an aryloxy moiety in ortho or para position to said activating group, with (2) a second monomer which contains:
   (a) one or more aryloxy moieties linked by the oxygen directly to;
   (b) a leaving group that can easily be removed from the oxygen in the presence of a catalyst in a concentration effective to promote exchange of the aryloxy moiety ortho or para to the activating group in the first monomer for the aryloxy moiety of the second monomer.

2. The process of claim 1 wherein the first monomer bearing a moiety of the formula:

$$A\text{-}X\text{-}Ar^1\text{-}O\text{-}Ar^2$$

and the second monomer bearing a moiety of the formula:

$$Y\text{-}O\text{-}Ar^3\text{-}B$$

react to form the linkage:

$$A\text{-}X\text{-}Ar^1\text{-}O\text{-}Ar^3\text{-}B + Y\text{-}O\text{-}Ar^2$$

wherein:
$Ar^1$, $Ar^2$ and $Ar^3$ are aryl moieties;
X is an activating group, which comprises a sulfonyl, sulfoxide, azo or carbonyl group;
Y is a leaving group which is a moiety of the formula $R_3Si$, $R_3Sn$, $R_3C$, RCO or H, wherein each R is independently a 1 to 10 carbon hydrocarbon radical optionally substituted with alkoxy, aryloxy or halide substituents; and
A and B have an aryl-aryl ether moiety, an aryloxy moiety bonded to a leaving group, or a polyarylether moiety.

3. The process of claim 1 wherein said first and second monomers conform to the formula:

$$YO\text{-}Ar^1\text{-}X\text{-}Ar^2\text{-}O\text{-}Ar^3$$

wherein each Ar is independently an aryl moiety of from 6 to 18 carbon atoms; X is an activating group, which comprises a sulfonyl, sulfoxide, azo or carbonyl group bonded directly to $Ar^2$; and Y is a leaving group which comprises a moiety of the formula $R_3Si$, $R_3Sn$, $R_3C$, RCO or H, wherein each R is independently a 1 to 10 carbon hydrocarbon radical optionally substituted with alkoxy, aryloxy or halide substituents; and wherein the catalyst is an alkali metal halide, hydride, carbonate or hydrocarbonyl oxide.

4. The process of claim 3 wherein the activating group X contains a carbonyl or sulfonyl group bonded directly to $Ar^2$.

5. The process of claim 4 wherein the leaving group Y is hydrogen or a trialkyl silyl group.

6. The process of claim 5 wherein each monomer is identical in structure.

7. The process of claim 5 wherein the catalyst comprises a fluoride, carbonate, phenate or alkoxide of sodium, potassium or cesium.

8. The process of claim 7 wherein the catalyst comprises cesium phenate.

9. The process of claim 5 wherein each Ar is a phenyl moiety which is unsubstituted or substituted only with hydrocarbyl, alkoxy, aryloxy or halide moieties.

10. The process of claim 5 wherein the reaction is carried out at between about 250° C. and about 375° C.

11. The process of claim 10 wherein the reaction is carried out at between about 275° C. and about 350° C.

12. The process of claim 5 wherein the polymer produced conforms to the formula:

$$Y\{O\text{-}Ar^1\text{-}X\text{-}Ar\text{-}^2\}_n O\text{-}Ar^3$$

wherein n specifies a number of repeating units in excess of 1.

13. The process of claim 1 wherein a first monomer conforming to the formula:

$$Ar^1\text{-}O\text{-}Ar^2\text{-}X\text{-}Ar^3\text{-}O\text{-}Ar^4$$

is polymerized with a second monomer conforming to the formula:

$$Y\text{-}O\text{-}Ar^5\text{-}O\text{-}Y$$

wherein each Ar is independently an aryl moiety containing 6 to 18 carbon atoms; X is an activating group, which comprises a sulfonyl, sulfoxide, azo or carbonyl group bonded directly to each of $Ar^2$ and $Ar^3$; and Y is a leaving group which compiises a moiety of the formula $R_3Si$, $R_3Sn$, $R_3C$, RCO or H, wherein each R is independently a 1 to 10 carbon hydrocarbon radical optionally substituted with one or more alkoxy, aryloxy or halide substituents.

14. The process of claim 13 wherein the activating group X comprises a carbonyl or sulfonyl group bonded directly to each of $Ar^2$ and $Ar^3$.

15. The process of claim 14 wherein each leaving group Y is independently hydrogen or a trialkyl silyl group.

16. The process of claim 15 wherein only two species of monomer are used in the polymer.

17. The process of claim 15 wherein the catalyst comprises a fluoride, carbonate, phenate or alkoxide of sodium, potassium or cesium.

18. The process of claim 17 wherein the catalyst comprises cesium phenate.

19. The process of claim 15 wherein each Ar is a mono- or divalent phenyl moiety, which is unsubstituted or substituted only with one or more hydrocarbyl, alkoxy, aryloxy or halide moieties.

20. The process of claim 15 wherein the reaction is carried out at between about 250° C. and about 375° C.

21. The process of claim 20 wherein the reaction is carried out at between about 275° C. and about 350° C.

22. The process of claim 16 wherein a polymer which conforms to the following formula is formed:

$$Ar^1\text{-}O\{Ar^2\text{-}X\text{-}Ar^3\text{-}O\text{-}Ar^5\text{-}O\}_n Y$$

wherein n specifies a number of repeating units in excess of one.

23. The process of claim 5 wherein one or more monomers is chosen from the group consisting of 4-hydroxy-4'-phenoxybenzophenone; 4-hydroxyphenyl-4'-phenoxyphenylsulfone; 4-trimethylsiloxy-4'-phenoxybenzophenone and 4-trimethylsiloxyphenyl-4'-phenoxyphenylsulfone.

24. The process of claim 15 wherein one or more monomers is chosen from the group consisting of bis-(4-phenoxyphenyl)sulfone; 1,3-bis-(4-phenoxybenzoyl)benzene; 1,4-bis-(trimethylsiloxy)benzene; 4,4'-bis(-trimethylsiloxy)biphenyl; hydroquinone and bisphenol A.

* * * * *